United States Patent
Amato et al.

(10) Patent No.: US 6,425,935 B1
(45) Date of Patent: Jul. 30, 2002

(54) TRAILER AIR DRYER WITH PURGE DURING PARK FEATURE

(75) Inventors: William P. Amato, Avon; Fred Hoffman, Columbia Station; Charles E. Eberling, Welling, all of OH (US)

(73) Assignee: Bendix Commercial Vehicle Systems LLC., Elyria, OH (US)

( * ) Notice: Subject to any disclaimer, the term of this patent is extended or adjusted under 35 U.S.C. 154(b) by 0 days.

(21) Appl. No.: 09/563,274

(22) Filed: May 3, 2000

(51) Int. Cl.[7] .......................... B01D 53/04; B60T 17/00
(52) U.S. Cl. ................... 95/1; 95/121; 96/109; 96/143; 55/DIG. 17
(58) Field of Search .................. 55/385.3, 420, 55/DIG. 17; 95/1, 90, 117, 121, 122, 148; 96/108, 109, 143, 188, 408, 115

(56) References Cited

U.S. PATENT DOCUMENTS

| | | | |
|---|---|---|---|
| 3,714,763 A | * | 2/1973 | Suzuki |
| 4,007,021 A | * | 2/1977 | Gyllinder .................. 95/123 |
| 5,145,495 A | * | 9/1992 | Elamin |
| 5,186,522 A | * | 2/1993 | Spencer .................... 303/1 |
| 5,592,754 A | * | 1/1997 | Krieder et al. ............ 34/527 |
| 6,074,177 A | * | 6/2000 | Kobayashi et al. ........ 96/152 |
| 6,074,462 A | * | 6/2000 | Quinn et al. .............. 96/113 |
| 6,077,330 A | * | 6/2000 | Sabelstrom ............... 96/114 |
| 6,120,107 A | * | 9/2000 | Eslinger .................... 96/114 |
| 6,203,601 B1 | * | 3/2001 | Trapp et al. .............. 96/130 |

* cited by examiner

Primary Examiner—Duane Smith
Assistant Examiner—Frank M. Lawrence

(57) ABSTRACT

An air dryer system for a trailer braking assembly is modified to provide a purge flow when the park brakes are actuated. An air reservoir, either the main air tank or a separate reservoir, is in operative communication with the trailer air dryer. A valve disposed at a supply end of the trailer air dryer selectively vents a purge flow to atmosphere in response to a park brake application. A restricting orifice limits the purge flow through the trailer air dryer to extend the purge time and maximize the removal of moisture from the air dryer.

19 Claims, 1 Drawing Sheet

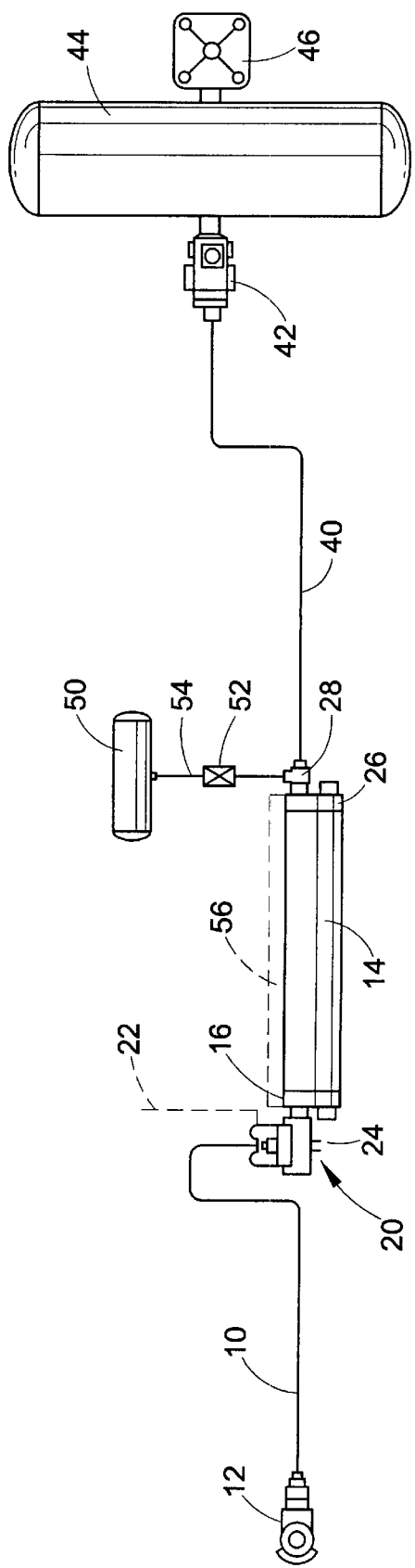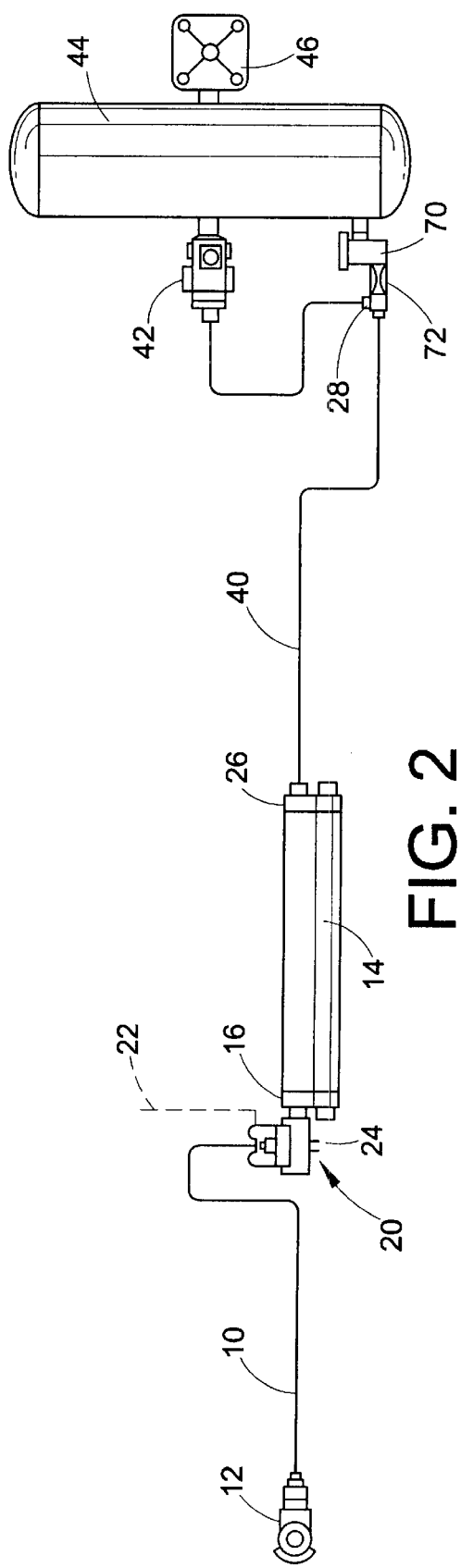

TRAILER AIR DRYER WITH PURGE DURING PARK FEATURE

BACKGROUND OF THE INVENTION

1. Field of the Invention

This invention relates to an air dryer system for use in a compressed air system. More particularly, the invention relates to a trailer air dryer system having a purge arrangement that is responsive to actuation of a parking brake.

2. Discussion of the Art

The assignee of the present application commonly owns related U.S. Application, Ser. No. 09/399,285, Filed Sep. 17, 1999, directed to a trailer air dryer. The trailer air dryer protects air operated devices associated with a trailer (for example, an air braking system, an air suspension system, or still other systems that use compressed air associated with the trailer) by removing moisture and contaminants from the air before it reaches these devices.

A preferred trailer air dryer is shown and described in that application, the details of which are incorporated herein by reference, although not deemed necessary to a full and complete understanding of the present invention. The trailer air dryer employs a desiccant material or drying agent through which the air passes to remove entrained moisture and thereby limit problems associated therewith. The moisture is adsorbed by the desiccant and removed from the compressed air before it is communicated to the air tank or storage reservoir. In addition, foreign particles and contamination are also removed by the trailer air dryer so that a filtered, relatively dry air is sent to the air tank.

In the device shown and described in the commonly owned pending application, moisture is adsorbed during wet air consumption and previously captured moisture is periodically released in a non-cyclic fashion when the incoming air is dry. Thus, the trailer air dryer system relies on ambient dry air to regenerate the desiccant in a non-cyclic fashion. Without a cyclic purging, the dryer acts as a buffer holding water vapor when the trailer is receiving wet air and periodically passing along some of the entrained moisture when the trailer is receiving dry air. Ultimately, the water vapor trapped during wet operation is passed through the air brake system during dry operation. If the trailer air dryer is completely saturated, it will unfortunately pass wet air as if there were no air dryer in the system.

Accordingly, a need exists to periodically purge the trailer air dryer in an effort to decrease the prospects for moist air being conveyed to the braking system.

SUMMARY OF THE INVENTION

The present invention solves the noted problems and others and provides a purge system for a trailer air dryer that reduces or eliminates the disadvantages of the existing trailer air dryer.

According to the invention, an air dryer system includes a valve in operative communication with a supply end of a trailer air dryer. An air reservoir is in communication with a delivery end of the trailer air dryer. When the valve communicates with atmosphere or ambient in response to a park brake application, a purge flow from the air reservoir and through the trailer air dryer to the valve is established.

According to another aspect of the invention, a restricting orifice limits the purge flow through the trailer air dryer to extend the purge time and maximize removal of moisture from the trailer air dryer.

According to another aspect of the invention, the air reservoir is separate from an air tank associated with the trailer.

According to yet another aspect of the invention, a check valve is associated with the restricting orifice and precludes air flow into the air reservoir and permits purge flow from the reservoir to a preselected pressure level.

Still another aspect of the invention relates to a method of purging a trailer air dryer by opening a valve port to atmosphere in response to a park brake application and directing a purge flow from the air source through the trailer air dryer.

A primary benefit of the present invention is the ability to eliminate or reduce disadvantages associated with moisture in the existing trailer air dryer design.

Still another benefit resides in the ability to maintain all of the performance advantages of the existing trailer air dryer.

Yet another benefit of the invention is associated with the ease in which the existing trailer air dryer can be modified to incorporate the purge system.

Still other advantages and benefits of the invention will become apparent to those skilled in the art upon a reading and understanding of the following detailed description.

BRIEF DESCRIPTION OF THE DRAWINGS

FIG. 1 is a schematic representation of a trailer air dryer system incorporating the purge system of the present invention.

FIG. 2 is a schematic representation of a second preferred embodiment.

DETAILED DESCRIPTION OF THE PREFERRED EMBODIMENTS

A portion of a trailer brake assembly is shown in FIG. 1. Particularly, supply line 10 has an upstream end 12 that communicates with a control valve on the dash of a vehicle such as a tractor (not shown). Actuating the control valve selectively supplies compressed air to release the spring applied, air released park brakes (not shown). A trailer air dryer 14 has a supply end 16 connected to the supply line 10. Preferably located at the supply end is a quick release valve 20 that normally allows compressed air from the supply line to flow through the trailer air dryer to supply the downstream reservoir or air tank associated with the brake system. When the park brake is applied, the air dryer communicates with ambient through an exhaust port 24. Alternatively, a separate control line 22 could be responsive to the application of the park brake to open an exhaust port 24 and allow the air dryer to communicate with ambient. Preferably, the exhaust port is dimensioned to allow the purge flow, i.e., in the right to left direction as shown in FIG. 1, to be easily accommodated. Stated another way, the exhaust port is sized so as not to hinder or restrict the purge flow to ambient.

At the opposite or delivery end 26 of the air dryer, a T-fitting 28 is incorporated into the system. A downstream line 40 proceeds from the fitting to a valve 42 associated with an air tank or reservoir 44. The air tank stores the compressed air required for braking needs, air suspension, etc. The air tank is suitably dimensioned to satisfy compressed air needs of the trailer. A valve 46 disposed downstream of the air tank is selectively opened and closed to distribute the compressed air to the desired system components, e.g. the brake system. The structure and operation of the valves 42, 46 in conjunction with the air tank are generally well known in the art so that further discussion herein is deemed unnecessary to a full and complete understanding of the present invention.

As described in the commonly owned application, incorporation of the trailer air dryer removes moisture from the system preferably before it reaches the tank or reservoir 44. However, if the drying agent or desiccant contained in the air dryer is already saturated, and moist compressed air is still supplied to the trailer, there is the potential that moist air will also reach the reservoir and ultimately and undesirably be distributed to the air operated systems such as the trailer brakes. Although the passage of dry compressed air through the system removes some of the adsorbed moisture from the desiccant and recharges it during operation, there is still the potential, however, that undesired amounts of moisture could be distributed downstream.

In accordance with the present invention, a purge air flow is provided through the trailer air dryer from the delivery end 26 to the supply end 16 in response to a particular event. In the preferred embodiment of FIG. 1, an air tank or reservoir 50 is employed separate from the main tank 44. It is contemplated that the air tank 50 will have a reduced volume relative to the main air tank. A restricting orifice 52 is disposed in line 54 that communicates with the T-fitting 28 associated with the delivery end 26 of the trailer air dryer. The valve 42 includes a check arrangement so that compressed air in the tank 44 will not flow toward the trailer air dryer through line 40. Instead, in response to a particular event (which in this instance is park brake actuation), the exhaust port 24 of the quick release valve 20 is opened. Opening the exhaust port allows air and entrained or adsorbed moisture in the desiccant to exhaust from the trailer air dryer. Particularly, the compressed air that is stored in the air tank 50 is metered or restricted through the orifice 52. Because of the orifice, the purge flow will proceed for an extended period of time and at a relatively low pressure, e.g. nearly atmosphere or just above atmosphere. The purge flow expels the moisture from the air dryer as it is exhausted to ambient through port 24.

Although the quick release valve could be located anywhere between the dash and the trailer air dryer, it is preferably located adjacent the trailer air dryer. Consequently, it is not necessary to purge the entire supply line extending between the dash and the trailer air dryer. As will be appreciated, the supply line could be on the order of forty feet and, moreover, the operator would audibly detect the air released in the tractor cab. Therefore, it is deemed desirable to merely vent to atmosphere at the trailer air dryer where the operator would be less likely to hear the air release (and thus perceive that there is a problem when in fact there is no problem).

A separate air tank 50 is preferred because it simplifies the system. A separate air tank provides a purge volume that is more efficient. It will be charged with the initial fill air so that there is an improved chance that it will be filled with dry air, whereas the main air tank which is depleted and replenished over the course of a day has a greater chance to have moisture stored therein.

It is also contemplated as evidenced by dotted line, that the trailer air dryer housing could be modified to incorporate an integral cavity 56 that acts as the air tank 50. In other words, the air tank that provides the purge air flow could be integrally formed in the trailer air dryer housing along with the orifice so that the number of connections and potential leaks can be reduced.

It will also be appreciated that the quick release valve should otherwise have no impact on the air flow through the trailer air dryer. Only a small amount of compressed air is required for the purge function. By associating the purge function with the application of the park brake, as opposed to the regular application of the trailer brakes, a sufficient, frequent purging of the trailer air dryer is attained.

FIG. 2 illustrates another preferred embodiment of the invention. For purposes of simplicity, many components are identified by like reference numerals to refer to like elements. Again, compressed air is provided through line 10 to a quick release valve 20. The valve is in operative communication and responsive to operation of the dash control used to actuate the park brake through control line 22. Actuating the park brake opens the exhaust port 24. The trailer air dryer 14 communicates with the quick release valve at the supply end 16 and communicates with a T-fitting 28 provided in pneumatic line 40 that extends from the delivery end 26 of the trailer air dryer. Here, air tank 44 is used as the air source or purge volume for the purge flow. No separate air tank is used. The valves 42, 46 associated with the air tank remain unchanged and unaffected.

An additional single check, pressure relief valve 70 is added to the system along with a restricting orifice 72 interposed between the T-fitting 28 and the air tank 44. Air flow will not enter the air tank through the check valves 70 but will be bled from the air tank 44 through the restricting orifice, through the fitting 28, to line 40 and thus purge the trailer air dryer when the quick release valve exhaust port is opened in response to a park brake actuation.

It will also be appreciated that the purge flow will exit the air tank but will not allow the air tank to be depleted or siphoned below a certain preselected level. That is, the check valve will seat once the air tank pressure reaches a preselected minimum level to preclude further purge flow to the trailer air dryer.

It is also contemplated that the system of FIG. 2, i.e., the valve 70 and orifice 72, could be directly incorporated into the valve 42. Again, the function would otherwise be the same although the number of connections and potential leak paths would be reduced.

In operation, the trailer air dryer purges every time the trailer park brakes are applied. All other performance advantages of the existing trailer air dryer are maintained and the disadvantages are reduced or eliminated. When the trailer air dryer is partially saturated, dry air from a separate reservoir is used to purge the air dryer through appropriate valving to reduce the level of saturation. This extends the amount of time that the system operates in a dry mode (or the amount of air that the system can dry). This feature effectively increases the drying capacity of the dryer.

When the trailer air dryer is completely saturated and then connected to a dry tractor, a purge operation during park would reduce the amount of time it takes to remove all of the water vapor from the dryer. Some of the water vapor will be purged from the system. This feature reduces the disadvantage of the existing system where the saturated trailer air dryer is delivering wetter air than that which is available from the dry tractor.

Though a trailer is often operated for hours without parking, it is always parked when being transferred from one tractor to another. This system offers an opportunity to purge some of the water vapor collected in the trailer air dryer. In applications where trailers are moved frequently, such as a trailer yard with a "trailer jockey" where the trailers are parked repeatedly, the purge will happen often when the system of the present invention is employed.

The invention has been described in reference to the preferred embodiments. Obviously, modifications and alterations will occur to others upon a reading and understanding of the detailed description. It will be understood that either the air tank 50 or the air tank 44 provide an air reservoir, or a purge volume, that provides the purge flow through the trailer air dryer in the present invention. Even though the separate air tank 50 is preferred, reference to an air reservoir should not be construed as being limited to one embodiment over the other. The invention is intended to include such modifications and alterations in so far as they come within the scope of the appended claims and equivalents thereof.

Having thus described the invention, we claim:

1. A method of purging a trailer air dryer from a source of air comprising the steps of:

opening a valve port upstream of the trailer air dryer to atmosphere in response to a park brake application; and directing a purge flow from the air source through the trailer air dryer to communicate with atmosphere.

2. The method of claim 1 further comprising the step of restricting the purge flow from the air source to extend the purge time and maximize removal of moisture from the air dryer.

3. The method of claim 1 further comprising the step of providing a separate air tank for storing the purge flow.

4. The method of claim 3 wherein the providing step includes the step of integrally integrating the air tank into a housing of the trailer air dryer.

5. The method of claim 1 further comprising the steps of restricting the purge flow from the air source to extend the purge time and cutting off the purge flow when the pressure in the air source reaches a preselected minimum.

6. An air dryer system for a trailer braking assembly, said trailer braking assembly including a parking brake that requires application of air pressure to be maintained in an non-actuated state and is actuated by removal of applied air pressure, said air dryer system comprising:

a trailer air dryer having a supply end adapted to receive air from an associated source, and a delivery end for delivering air to an associated braking assembly;

an air reservoir in operative communication with the delivery end of the trailer air dryer; and a valve in operative communication with the supply end of the trailer air dryer, the valve including means for venting to atmosphere to establish a purge flow from the air reservoir through the trailer air dryer in response to actuation of said parking brake.

7. The system of claim 6 further comprising a restricting orifice for limiting the purge flow through the trailer air dryer.

8. The system of claim 7 wherein the restricting orifice is located between the air reservoir and the trailer air dryer.

9. The system of claim 7 wherein the air reservoir is separate from an air tank associated with the trailer.

10. The system of claim 7 further comprising a valve between the restricting orifice and the air reservoir.

11. The system of claim 6 wherein the air reservoir is separated from an air tank associated with the trailer.

12. The system of claim 10 wherein the valve between the restricting orifice and the air reservoir is a check valve that permits purge flow from the air reservoir and precludes air flow into the air reservoir.

13. The system of claim 12 wherein the check valve is biased so that purge flow from the air reservoir is limited to a preselected pressure level.

14. An air dryer system for a trailer braking assembly, said trailer braking assembly including a parking brake that requires application of air pressure to be maintained in an non-actuated state and is actuated by removal of applied air pressure, said air dryer system comprising:

an air dryer having a drying agent received therein, a supply end adapted to receive compressed air from an associated upstream source, and a delivery end that communicates with a downstream braking system;

a valve at the supply end of the air dryer that includes means for selectively communicating with atmosphere in response to application of the parking brake; and an air reservoir that is interposed between the delivery end of the air dryer and the remainder of the associated trailer brake system for supplying purge flow from the delivery end, through the drying agent and supply end to the valve when opened to atmosphere.

15. The system of claim 14 further comprising a restricting orifice interposed between the air reservoir and the air dryer to maximize the time of the purge flow.

16. The system of claim 14 wherein the air reservoir is integrated into the air dryer to limit the number of separate components.

17. The system of claim 14 wherein the air reservoir stores compressed air for trailer braking needs.

18. The system of claim 14 wherein the air reservoir is separate from an air tank that stores compressed air for trailer braking needs.

19. The system of claim 14 further comprising a restricting orifice and a check valve interposed between the air reservoir and the air dryer to maximize the time of the purge flow and limit the amount of air from the air reservoir for purging, respectively.

\* \* \* \* \*